(12) United States Patent
Brodjonegoro et al.

(10) Patent No.: US 12,343,734 B2
(45) Date of Patent: Jul. 1, 2025

(54) CYLINDRICAL ORE WASHING MACHINE USED FOR HYDROMETALLURGICAL SMELTING OF LATERITE NICKEL ORE

(71) Applicants: PT ESG NEW ENERGY MATERIAL, Dki Jakarta (ID); PT QMB NEW ENERGY MATERIALS, Dki Jakarta (ID); GEM CO., LTD., Guangdong (CN); PT GEM INDONESIA NEW ENERGY MATERIALS, Dki Jakarta (ID)

(72) Inventors: Satryo Soemantri Brodjonegoro, Dki Jakarta (ID); Kaihua Xu, Guangdong (CN); Rizky Wanaldi, Dki Jakarta (ID); Tegar Mukti Aji, Dki Jakarta (ID); Andi Syaputra Hasibuan, Dki Jakarta (ID); Evan Wahyu Kristiyanto, Dki Jakarta (ID); Pengyun Xu, Dki Jakarta (ID); Aad Alief Rasyidi Baking, Dki Jakarta (ID); Arnaldo Marulitua Sinaga, Dki Jakarta (ID)

(73) Assignees: PT ESG NEW ENERGY MATERIAL, Jakarta Selatan (ID); PT QMB NEW ENERGY MATERIALS, Jakarta Selatan (ID); GEM CO., LTD., Shenzhen (CN); PT GEM INDONESIA NEW ENERGY MATERIALS, Jakarta Selatan (ID)

( * ) Notice: Subject to any disclaimer, the term of this patent is extended or adjusted under 35 U.S.C. 154(b) by 0 days.

(21) Appl. No.: 18/870,457

(22) PCT Filed: Jun. 29, 2023

(86) PCT No.: PCT/CN2023/103878
§ 371 (c)(1),
(2) Date: Nov. 29, 2024

(87) PCT Pub. No.: WO2025/000351
PCT Pub. Date: Jan. 2, 2025

(65) Prior Publication Data
US 2025/0161954 A1      May 22, 2025

(51) Int. Cl.
*B03B 5/56*      (2006.01)
*B03B 9/04*      (2006.01)
*B08B 3/02*      (2006.01)

(52) U.S. Cl.
CPC ................. *B03B 5/56* (2013.01); *B03B 9/04* (2013.01); *B08B 3/02* (2013.01)

(58) Field of Classification Search
CPC ............... B08B 3/02; B03B 5/56; B03B 9/04
(Continued)

(56) References Cited

U.S. PATENT DOCUMENTS 1,140,962 A  *  5/1915  Davison ................... B03B 5/56
                                                       209/208

FOREIGN PATENT DOCUMENTS

AU         2023446737 B2  *  1/2025
CN         101433879 A          5/2009
(Continued)

OTHER PUBLICATIONS

International Search Report issued in corresponding International application No. PCT/CN2023/103878, mailed Dec. 21, 2023 (7 pages).
(Continued)

*Primary Examiner* — Terrell H Matthews

(57) ABSTRACT

Disclosed is cylindrical ore washer for hydrometallurgical smelting of laterite nickel ore, comprising a mounting bracket, a screening component, a regulator, and an ore-
(Continued)

washing component. The screening component comprises a frame, a cylinder body, a screening cylinder, and a driving component. The cylinder body is rotatably mounted on the frame along an axis oriented in a first direction. The screening cylinder is housed within the cylinder body, with a feed inlet and a discharge outlet located at opposite ends along the first direction, respectively. The cylindrical wall of the screening cylinder is provided with multiple screen holes, and an inner side wall of the screening cylinder protrudes to form a baffle plate. This disclosure is capable of impeding the movement of ore towards the discharge outlet, thereby prolonging the residence time of the ore within the screening cylinder and enhancing both the ore-washing efficiency and cleaning effectiveness.

9 Claims, 7 Drawing Sheets

(58) Field of Classification Search
USPC .......................................................... 209/452
See application file for complete search history.

(56) References Cited

FOREIGN PATENT DOCUMENTS

| CN | 205995762 U | | 3/2017 |
|----|-------------|---|--------|
| CN | 206374073 U | | 8/2017 |
| CN | 207709197 U | | 8/2018 |
| CN | 208643479 U | * | 3/2019 |
| CN | 209362698 U | * | 9/2019 |
| CN | 110639790 A | | 1/2020 |
| CN | 111215384 A | * | 6/2020 |
| CN | 212597473 U | | 2/2021 |
| CN | 218774957 U | * | 3/2023 |
| CN | 117136101 A | * | 11/2023 |
| CN | 221934182 U | * | 11/2024 |
| JP | 3028225 B1 | | 4/2000 |

OTHER PUBLICATIONS

Written Opinion of the International Search Authority in corresponding International application No. PCT/CN2023/103878, mailed Dec. 21, 2023 (7 pages).

* cited by examiner

CYLINDRICAL ORE WASHING MACHINE USED FOR HYDROMETALLURGICAL SMELTING OF LATERITE NICKEL ORE

FIELD OF THE DISCLOSURE

The disclosure relates to the technical field of ore processing equipment, in particular to a cylindrical ore washing machine used for hydrometallurgical smelting of laterite nickel ore.

BACKGROUND

Cylindrical ore washing machine is a large-scale equipment used in metallurgical mines, steel production, metallurgy, chemicals, and building materials industries for cleaning ores. Ore washing is a process of removing clayey materials from the ore; it is widely applied in various ore washing and desliming industries to eliminate the impact and hazards of mineral slime on subsequent processes, thereby achieving favorable separation indices.

A Chinese patent with publication number CN218774957U discloses an adjustable cylindrical ore washer, which comprises a base plate, a cylindrical ore washer body, and an adjuster. The base plate is symmetrically provided with threaded through-slots, and the upper surface of the base plate is symmetrically provided with multiple sets of fixing seats. The upper surface of the fixing seats is provided with inwardly recessed rotating grooves, within which auxiliary rollers are rotatably connected. The outer wall of the auxiliary rollers is provided with inwardly recessed indentations, and rings are symmetrically provided on the outer wall of the cylindrical ore washer body, which are installed within the indentations. The outer wall of the cylindrical ore washer body is provided with an external gear ring.

However, in the aforementioned prior art, the cylindrical ore washer body has a relatively large volume, resulting in a short residence time for the ore within the cylindrical ore washer body and consequently poor cleaning effectiveness.

SUMMARY

The purpose of this disclosure is to provide a cylindrical ore washing machine used for hydrometallurgical smelting of laterite nickel ore to solve the technical problem in the existing technology where the cylindrical ore washer body has a relatively large volume, leading to a short residence time for the ore inside the cylindrical ore washer body and consequently poor cleaning effectiveness.

In order to solve the above technical problems, this disclosure provides a cylindrical ore washing machine used for hydrometallurgical smelting of laterite nickel ore, comprising:
  a mounting bracket;
  a screening component, which comprises a frame, a cylinder body, a screening cylinder, and a driving component; the cylinder body is rotatably installed on the frame along the axis in a first direction; the screening cylinder is fitted inside the cylinder body and is coaxially arranged with it; the screening cylinder has a feed inlet and a discharge outlet at its opposite ends along the first direction, respectively; the screening cylinder is inclined downwards gradually from the feed inlet to the discharge outlet; the cylindrical wall of the screening cylinder is provided with multiple screen holes, which connect the cylinder body and the screening cylinder; a baffle plate protrudes from the inner sidewall of the screening cylinder; the baffle plate is inclined relative to the radial direction of the screening cylinder, and is located at the discharge outlet, the cylinder body is also equipped with a liquid outlet, which is located at the end of the cylinder body near the discharge outlet; the driving component is installed on the frame and connected to the cylinder body to drive the rotation of the screening cylinder; wherein the frame is movably mounted on the mounting bracket, allowing the inclination angle of the screening cylinder to be adjustable;
  a regulator, which is installed on the mounting bracket and connected to the frame; when the frame is moved to a preset position, the regulator fixes the frame in place;
  a collection pool, which is positioned corresponding to the liquid outlet and is used to collect the mud and smaller diameter ores discharged from the liquid outlet;
  a concentration detection device, which is installed within the collection pool and is used to detect the concentration of the material within the collection pool;
  an ore washing component, which is installed on the frame and is used to inject high-pressure water into the screening cylinder through the feed inlet to wash the ores; and,
  a control device, which is electrically connected to the regulator, the ore washing component, and the concentration detection device, allowing it to control the operation of the regulator and the ore washing component based on the detected concentration.

Furthermore, the baffle plate is set in an arcuate shape.

Furthermore, there are multiple baffle plates, which are arranged in a spiral pattern along the radial direction of the screening cylinder at intervals.

Furthermore, the frame has a first end and a second end opposite to each other along the first direction; The first end is rotatably mounted on the mounting bracket along an axis in the second direction, allowing the inclination angle of the frame to be adjustable; the feed inlet is located near the first end; the regulator is mounted on the mounting bracket and connected to the second end, when the frame is rotated to a preset angle, the regulator fixes the frame in place.

Furthermore, the regulator comprises a connecting plate and a driver, the connecting plate is movably mounted on the mounting bracket along the vertical direction, with its upper side in contact with the second end of the frame; the driver is mounted on the mounting bracket and connected to the connecting plate, driving the movement of the connecting plate.

Furthermore, the inner wall of the screening cylinder is equipped with multiple protrusions arranged in an array.

Furthermore, the protrusions extend in the radial direction of the screening cylinder; multiple protrusions are arranged at intervals along the circumferential direction of the screening cylinder, forming protrusion groups; there are multiple protrusion groups, and these protrusion groups are arranged at intervals along the radial direction of the screening cylinder.

Furthermore, the protrusions extend along the circumferential direction of the screening cylinder; multiple protrusions are arranged at intervals along the circumferential direction of the screening cylinder, forming protrusion groups; there are multiple protrusion groups, and these protrusion groups are arranged at intervals along the radial direction of the screening cylinder.

Furthermore, the driving component comprises two rotating shafts and a driving motor; the two rotating shafts are located on opposite sides of the cylinder body along a second direction; each rotating shaft is rotatably installed on the frame along the axis in a first direction, and each rotating shaft abuts against the outer side surface of the cylinder body; the driving motor is connected to one of the rotating shafts to drive its rotation, the first direction and the second direction are perpendicular to each other.

Furthermore, the ore washing component comprises a water source device, a water pump, a water inlet pipe, and a control valve; one end of the water inlet pipe is connected to the water source device through the water pump, and the other end of the water inlet pipe extends into the screening cylinder from the feed inlet; the control valve is installed on the water inlet pipe and is used to adjust the flow rate of the water inlet pipe.

Compared with existing technologies, the beneficial effect of this disclosure is: the cylindrical ore washing machine provided by this disclosure features a frame movably mounted on a mounting bracket, with a screening cylinder rotatably installed on the frame. The screening cylinder is equipped with a feed inlet and a discharge outlet at its opposite ends and is inclined downwards from the feed inlet to the discharge outlet. Inside the screening cylinder, a baffle plate is installed, and a driving component is connected to the screening cylinder. An ore washing component is used to inject high-pressure water into the screening cylinder through the feed inlet. In operation, the driving component first rotates the screening cylinder, and then ore mixed with soil is fed into the screening cylinder through the feed inlet. Due to the rotation and downward inclination of the screening cylinder, the ore rolls inside and gradually moves towards the discharge outlet under its own gravity. Simultaneously, the ore washing component sprays high-pressure water to clean the ore, allowing mud and smaller-diameter ore to be discharged through screen holes to the outside of the screening cylinder and ultimately into a collection pool. Eventually, the cleaned, larger-diameter ore is discharged from the screening cylinder through the discharge outlet. The baffle plate is designed to slow down the movement of the ore towards the discharge outlet, extending its residence time inside the screening cylinder. This not only enhances the ore washing efficiency but also improves the cleaning effect while reducing water consumption. Additionally, the baffle plate increases the surface area of the inner side of the screening cylinder, thereby enlarging the contact area with the ore. In this way, while ensuring sufficient contact area, the machine has the advantage of being smaller in size compared to existing washing machines, reducing the equipment's footprint and improving the space utilization of the plant.

The frame is movably mounted on the mounting bracket, enabling the screening cylinder on the frame to be similarly movable, thereby allowing adjustment of the inclination angle of the screening cylinder. This adjustment can be made based on the concentration of material in the collection pool, effectively altering the residence time of the ore within the screening cylinder. Furthermore, by controlling the water intake of the ore washing component, water conservation is achieved while ensuring the ore is thoroughly cleaned, promoting energy efficiency and environmental protection.

By controlling the regulator and ore washing component through control device, a high level of automation is achieved, and real-time adjustments can be made without manual intervention, thereby reducing the labor intensity of workers.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The preferred embodiments of this disclosure will be described in detail with reference to the accompanying drawings, which constitute a part of this disclosure and are used together with the embodiments to illustrate the principles of this disclosure, and are not intended to limit the scope of this disclosure.

Figure 1:
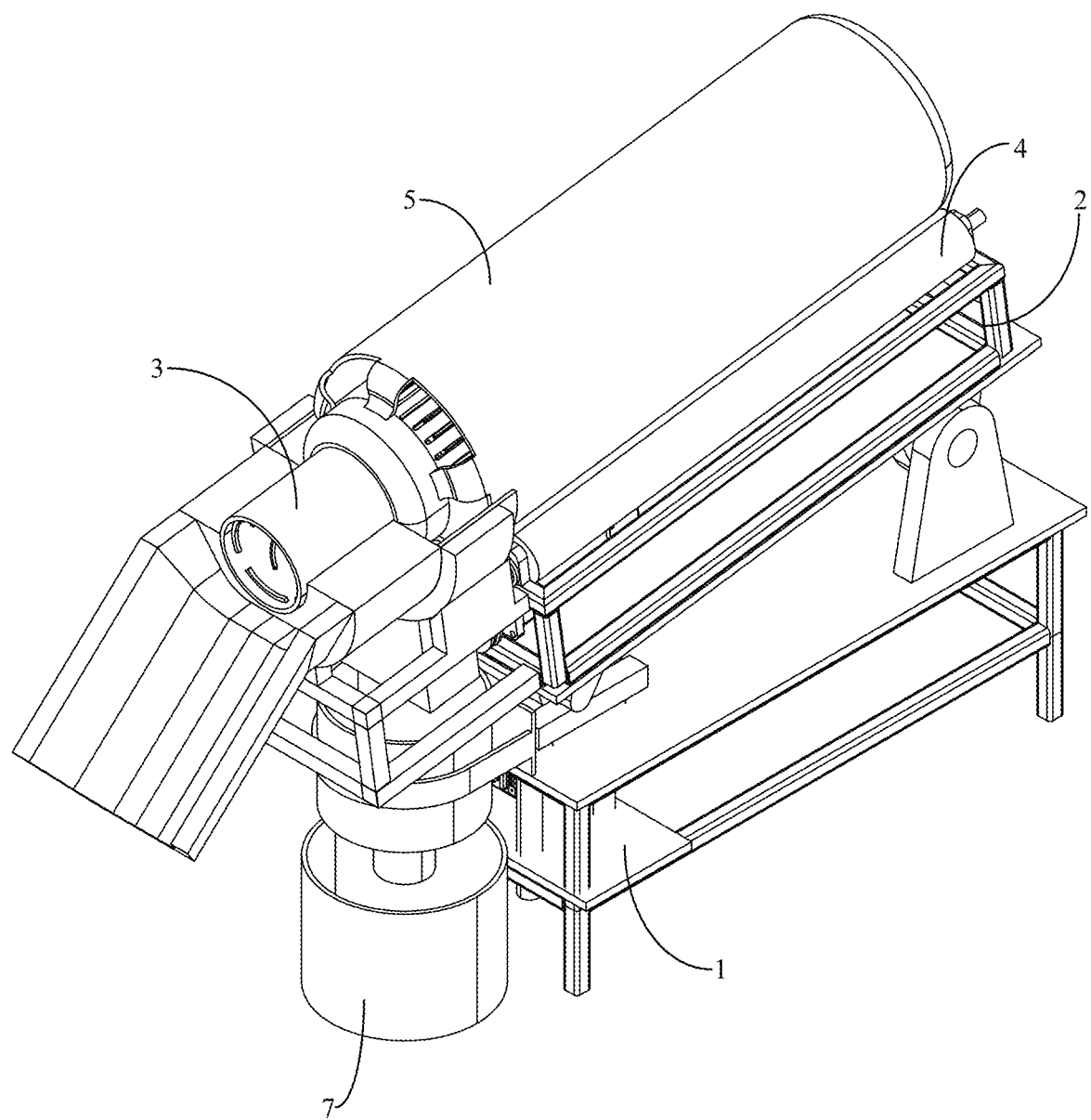
FIG. 1 is a schematic diagram of the structure of an embodiment of the cylindrical ore washing machine used for hydrometallurgical smelting of laterite nickel ore.
Figure 2:
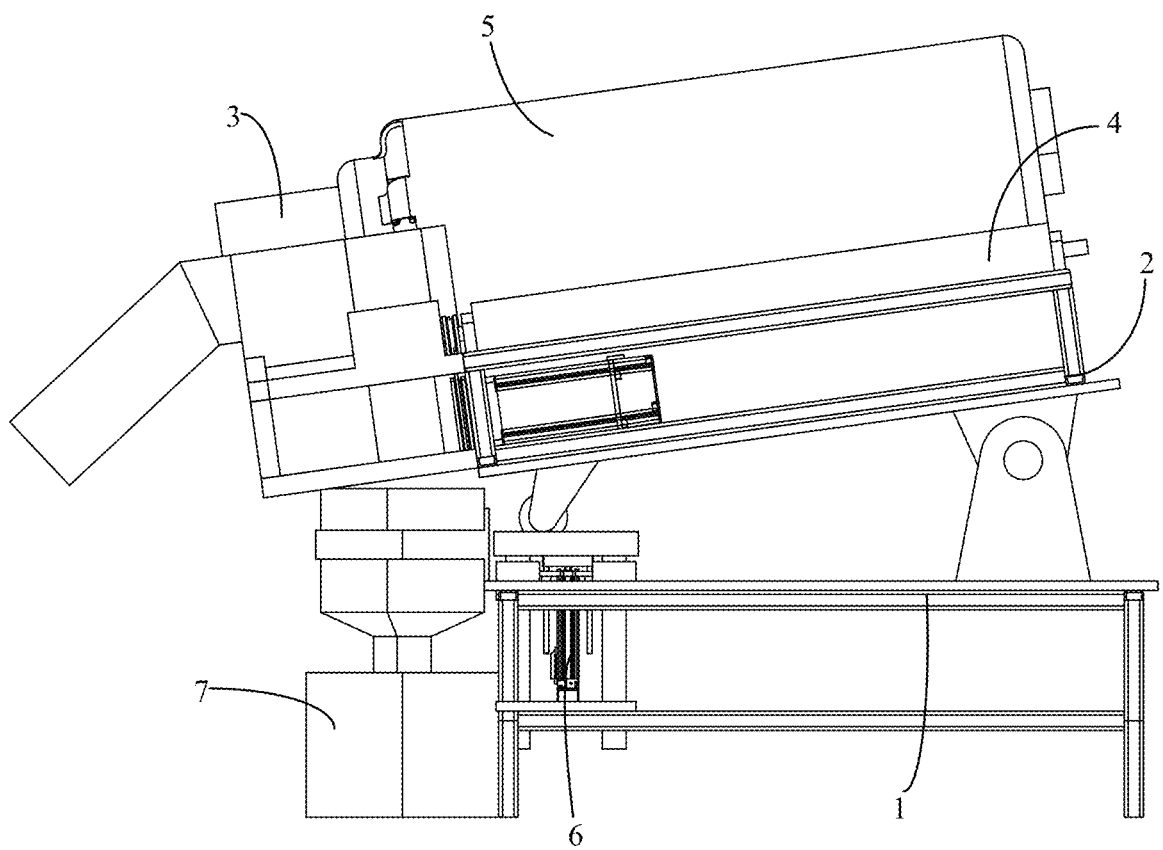
FIG. 2 is a front view of the cylindrical washing machine used for the hydrometallurgical smelting of laterite nickel ore in FIG. 1.
Figure 3:
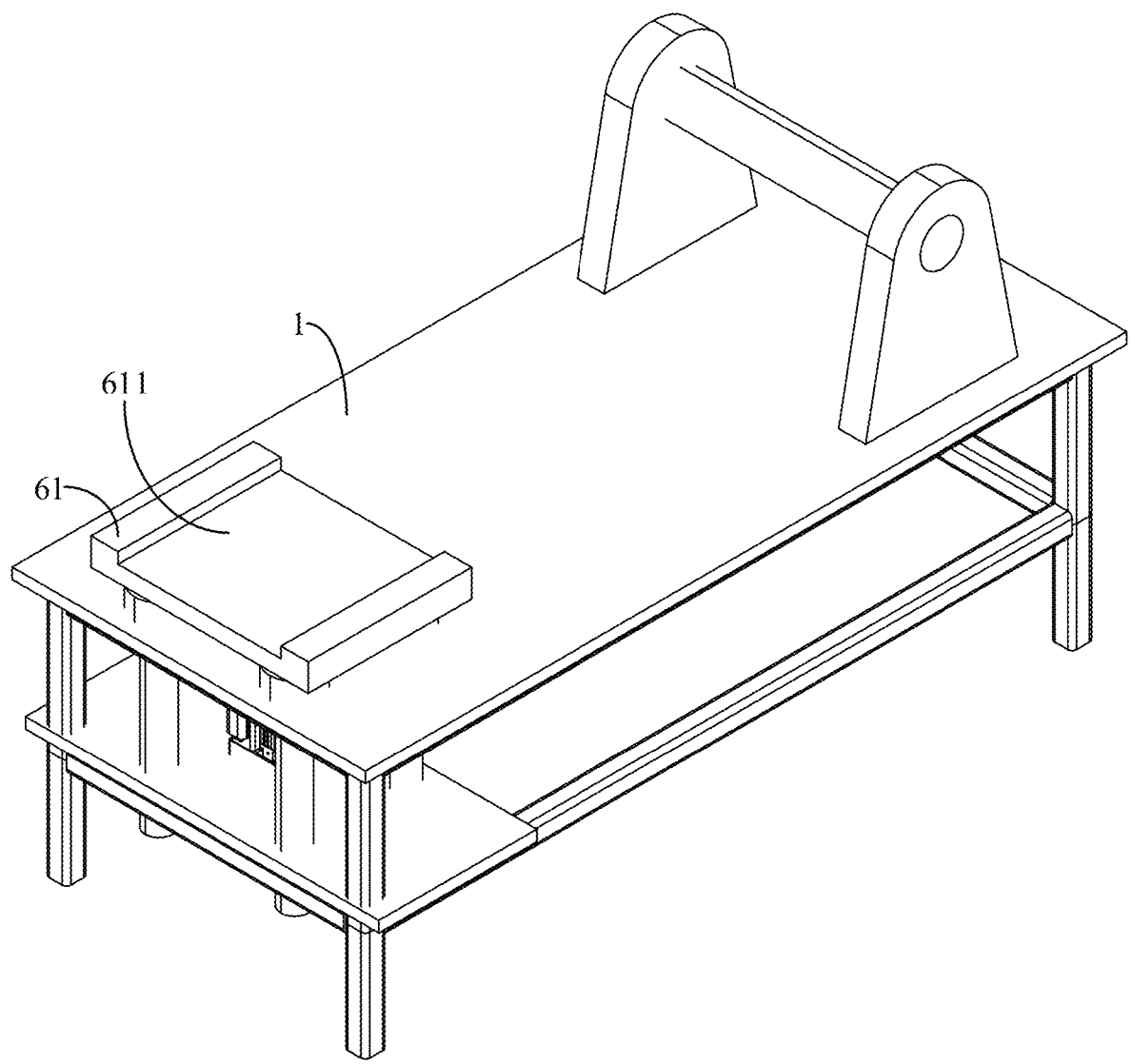
FIG. 3 is a three-dimensional schematic diagram of the mounting bracket in FIG. 1.

Please refer to FIG. 1 to FIG. 3, this disclosure provides a cylindrical ore washer for hydrometallurgical smelting of laterite nickel ore, which comprises a mounting bracket 1, a screening component, a regulator 6, a collection pool 7, a concentration detection device, an ore washing component, and a control device. The screening component comprises a frame 2, a cylinder body 5, a screening cylinder 3, and a driving component 4. The cylinder body 5 is rotatably installed on the frame 2 along the axis in a first direction. The screening cylinder 3 is fitted inside the cylinder body 5 and is coaxially arranged with it. The screening cylinder 3 has a feed inlet 34 and a discharge outlet 35 at its opposite ends along the first direction, respectively. The screening cylinder 3 is inclined downwards gradually from the feed inlet 34 to the discharge outlet 35. The cylindrical wall of the screening cylinder 3 is provided with multiple screen holes 33, which connect the cylinder body 5 and the screening cylinder 3. A baffle plate 32 protrudes from the inner sidewall of the screening cylinder 3. The baffle plate 32 is inclined relative to the radial direction of the screening cylinder 3, and is located at the discharge outlet 35.

The cylinder body 5 is also equipped with a liquid outlet 51, which is located at the end of the cylinder body 5 near the discharge outlet 35. The driving component 4 is installed on the frame 2 and connected to the cylinder body 5 to drive the rotation of the screening cylinder 3. Specifically, the frame 2 is movably mounted on the mounting bracket 1, allowing the inclination angle of the screening cylinder 3 to be adjustable.

The regulator 6 is installed on the mounting bracket 1 and connected to the frame 2. When the frame 2 is moved to a preset position, the regulator 6 fixes the frame 2 in place.

The collection pool 7 is positioned corresponding to the liquid outlet 51 and is used to collect the mud and smaller diameter ores discharged from the liquid outlet 51. The concentration detection device is installed within the collection pool 7 and is used to detect the concentration of the material within the collection pool 7. The ore washing component is installed on the frame 2 and is used to inject high-pressure water into the screening cylinder 3 through the feed inlet 34 to wash the ores. The control device is electrically connected to the regulator 6, the ore washing component, and the concentration detection device, allowing it to control the operation of the regulator 6 and the ore washing component based on the detected concentration.

The cylindrical ore washing machine for the hydrometallurgical smelting of laterite nickel ore provided in this disclosure features a frame 2 that is movably installed on a mounting bracket 1. A screening cylinder 3 is rotatably mounted on the frame 2, with a feed inlet 34 and a discharge outlet 35 located at opposite ends of the screening cylinder 3. The screening cylinder 3 is inclined downwards from the feed inlet 34 to the discharge outlet 35. Inside the screening cylinder 3, there is a baffle plate 32, and a driving component 4 is connected to the screening cylinder 3. The ore washing component is used to inject high-pressure water into the screening cylinder 3 through the feed inlet 34. During operation, the driving component 4 first rotates the screening cylinder 3. Then, ores covered with mud are fed into the screening cylinder 3 through the feed inlet 34. Due to the rotation and downward inclination of the screening cylinder 3, the ores roll inside the cylinder and gradually move towards the discharge outlet 35 under their own gravity. Simultaneously, the ore washing component sprays high-pressure water to clean the ores, allowing mud and smaller diameter ores to be discharged out of the screening cylinder 3 through screen holes 33 and ultimately into a collection pool 7. Finally, the cleaned, larger diameter ores are discharged from the screening cylinder 3 through the discharge outlet 35. The baffle plate 32 is set up to slow down the movement of the ores towards the discharge outlet 35, thereby extending the residence time of the ores inside the screening cylinder 3. This improves both the ore washing efficiency and cleaning effect while reducing water consumption. Additionally, the baffle plate 32 increases the surface area of the inner side of the screening cylinder 3, thereby increasing the contact area with the ores. As such, while ensuring sufficient contact area, the cylindrical ore washing machine has the advantage of a smaller size compared to existing ore washing machines, reducing the equipment footprint and improving the space utilization rate of the plant.

The frame 2 is movably installed on the mounting bracket 1, which allows the screening cylinder 3 mounted on the frame 2 to be adjustable as well. This enables the inclination angle of the screening cylinder 3 to be changed. By adjusting the inclination angle of the screening cylinder 3 based on the concentration of material in the collection pool 7, the residence time of the ores inside the screening cylinder 3 can be adjusted accordingly. Additionally, by controlling the water intake of the ore washing component, water conservation can be achieved while ensuring effective ore cleaning, contributing to energy-saving and environmental protection.

By controlling the regulator 6 and ore washing component through control device, a high level of automation is achieved, and real-time adjustments can be made without manual intervention, thereby reducing the labor intensity of workers.

Figure 7:
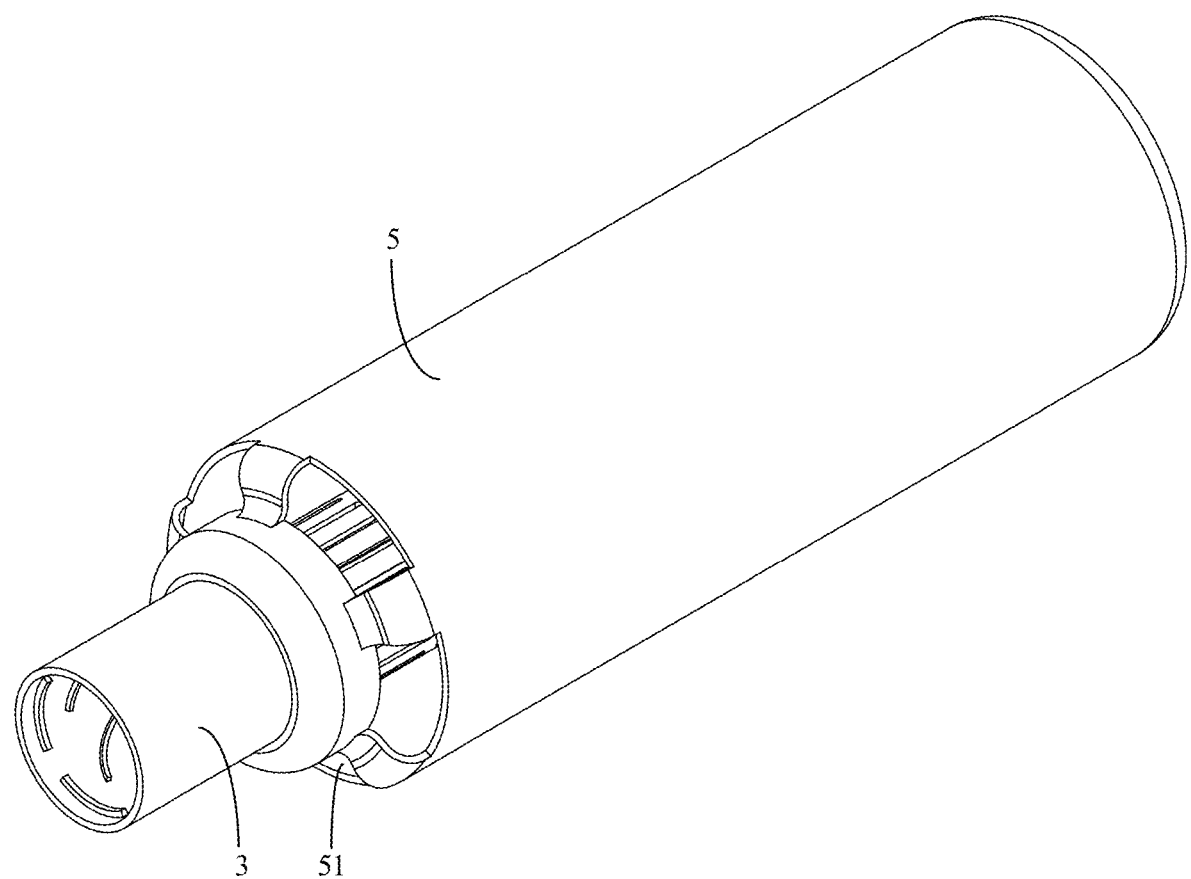
FIG. 7 is a three-dimensional schematic diagram of the screening cylinder and cylinder body in FIG. 1.
Figure 8:
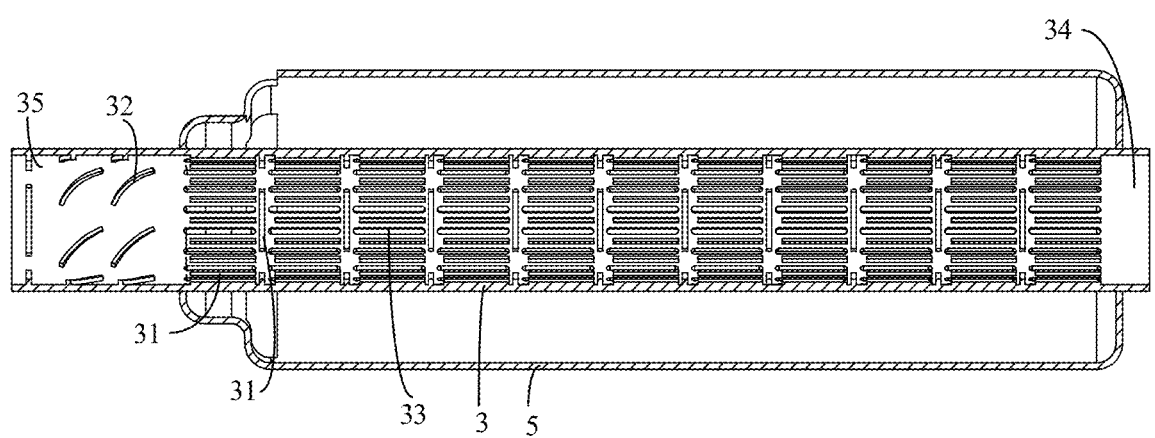
FIG. 8 is a sectional view of the screening cylinder and cylinder body in FIG. 7.
Figure 9:
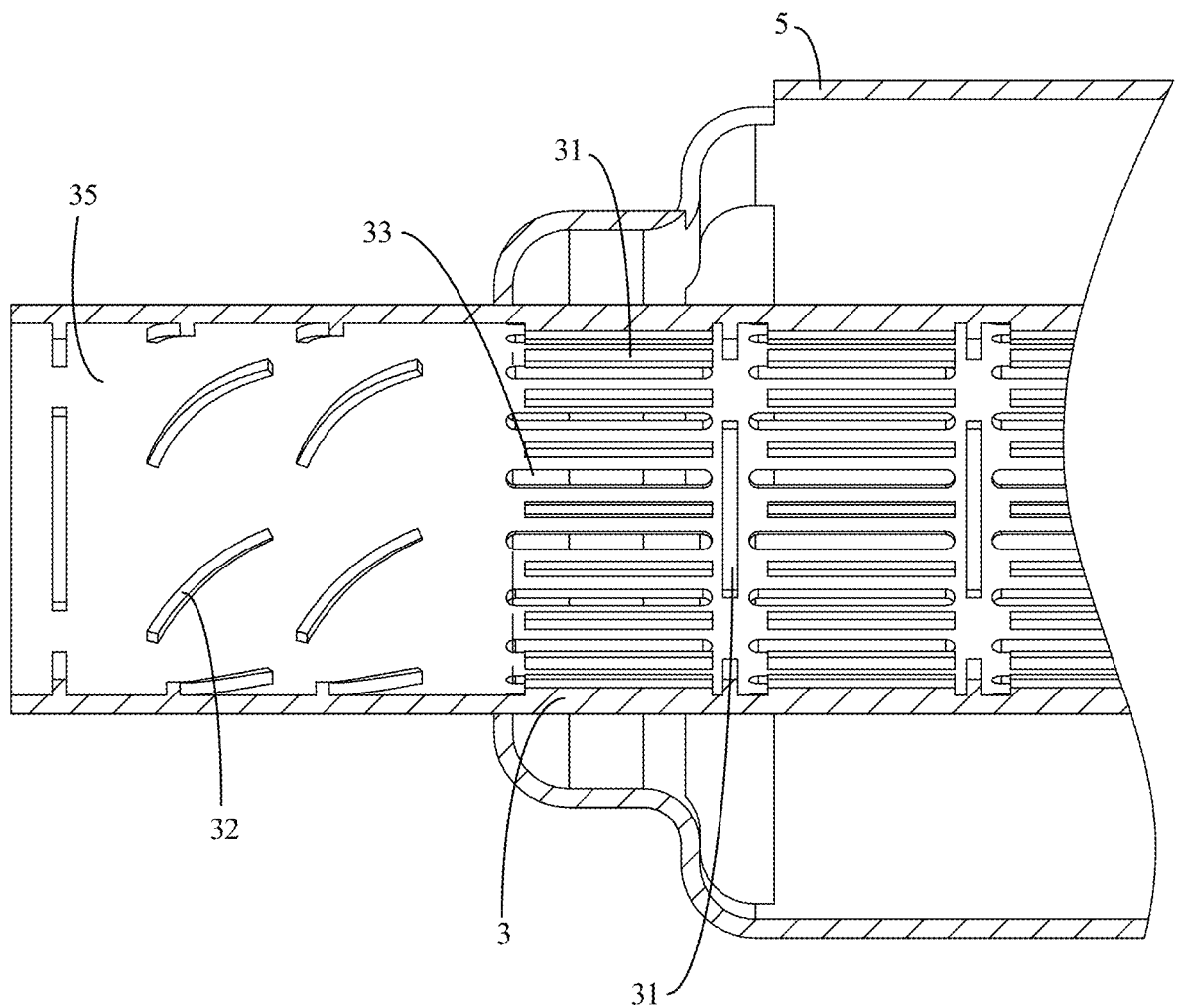
FIG. 9 is a partial cross-sectional view of the screening cylinder and cylinder body in FIG. 8.

Please refer to FIG. 7 to FIG. 9, it should be noted that the screening cylinder 3 is configured in a cylindrical shape with an internal channel. The two ends of the channel respectively constitute the feed inlet 34 and the discharge outlet 35. The screen holes 33 are located on the sidewall of the screening cylinder 3, connecting the channel to the outside environment. Multiple screen holes 33 are arranged in an array on the sidewall of the screening cylinder 3, and the first direction is consistent with the radial direction of the screening cylinder 3.

Furthermore, there are no restrictions on the shape and size of the screen holes 33, which can be set according to actual usage conditions. In this embodiment, the screen holes 33 are configured as elongated holes extending in the first direction. These screen holes 33 are capable of screening ores with a size of less than 350 mm.

Furthermore, in this embodiment, please refer to FIG. 8 and FIG. 9, the baffle plate 32 is configured in an arcuate shape. Such a configuration prolongs the residence time of the ores inside the screening cylinder 3 without impeding the discharge of ores from the discharge outlet 35.

Furthermore, in this embodiment, there are multiple baffle plates 32, which are arranged in a spiral pattern along the radial direction of the screening cylinder 3 at intervals. The baffle plates 32 are configured in an arcuate shape, and multiple baffle plates 32 lie on the same spiral line. This arrangement not only blocks the ores but also ensures smooth movement of the ores.

Furthermore, both end faces of the cylinder body 5 are provided with openings that communicate with its internal space. The diameters of these openings are compatible with the diameter of the screening cylinder 3. The screening cylinder 3 is disposed within the cylinder body 5 and is coaxial with it. Both ends of the screening cylinder 3 extend out of the cylinder body 5 through the two openings, facilitating the installation of the screening cylinder 3 into the cylinder body 5 and the entry and exit of ore into and from the screening cylinder 3. Additionally, the cylinder body 5 is equipped with a liquid outlet 51 that communicates with its internal space. During use, slurry and smaller diameter ores fall into the cylinder body 5 through the screen holes 33. Since the cylinder body 5 is coaxial with the screening cylinder 3, it is also inclined, allowing the slurry and smaller diameter ores to be discharged out of the cylinder body 5 through the liquid outlet 51 under their own gravity, thus facilitating the collection of smaller diameter ores.

Furthermore, in this embodiment, please refer to FIGS. 1 and 2. The frame 2 has a first end and a second end opposite to each other along the first direction. The first end is rotatably mounted on the mounting bracket 1 along an axis in the second direction, allowing the inclination angle of the frame 2 to be adjustable. Here, the feed inlet 34 is located near the first end. The regulator 6 is mounted on the mounting bracket 1 and connected to the second end, so that when the frame 2 is rotated to a preset angle, the regulator 6 fixes the frame 2 in place. With this arrangement, by rotating the frame 2 around the first end, the distance between the second end and the mounting bracket 1 can be adjusted. Since the feed inlet 34 is near the first end and the discharge outlet 35 is near the second end, changing the distance between the discharge outlet 35 and the mounting bracket 1, thus adjusting the inclination angle of the screening cylinder 3. Once the frame 2 is adjusted, it is fixed in place by connecting the regulator 6 to the second end, preventing it from accidentally rotating.

Figure 4:
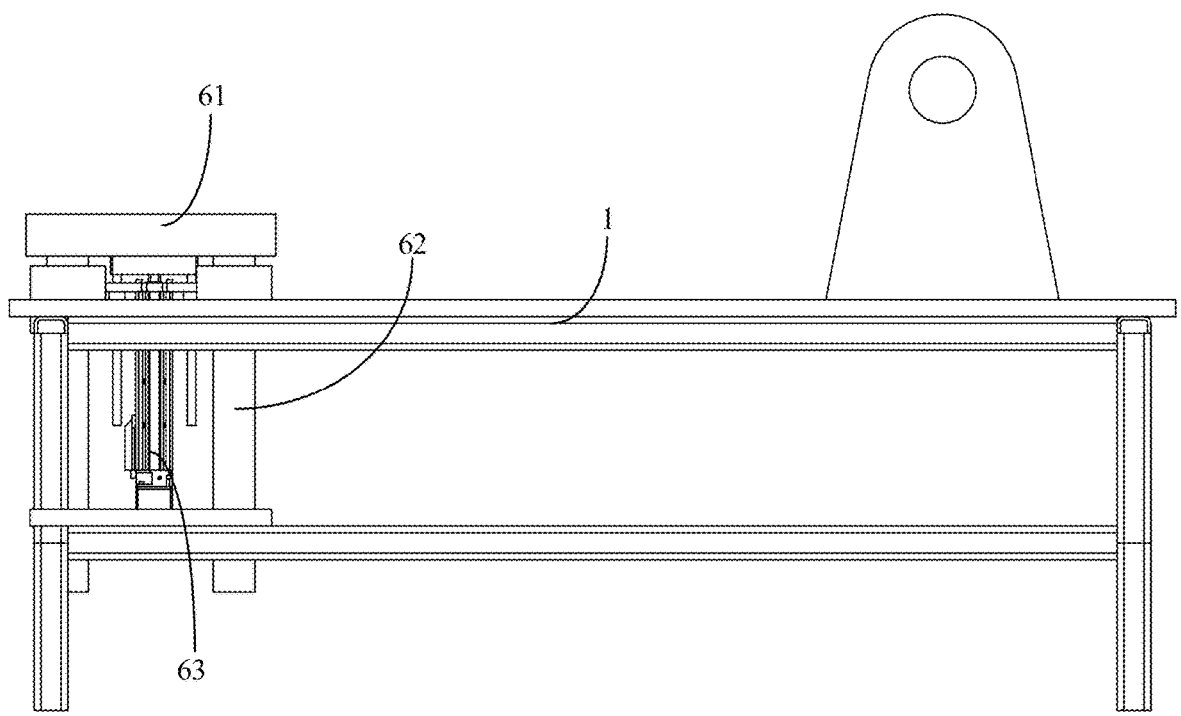
FIG. 4 is a front view of the mounting bracket in FIG. 3.

Furthermore, in this embodiment, please refer to FIG. 2 to FIG. 4, the regulator 6 comprises a connecting plate 61 and a driver 63. The connecting plate 61 is movably mounted on the mounting bracket 1 along the vertical direction, with its upper side in contact with the second end of the frame 2. The driver 63 is mounted on the mounting bracket 1 and connected to the connecting plate 61, driving its movement. As the connecting plate 61 moves up or down, the second end of the frame 2 slides along the upper side of the connecting plate 61, causing the frame 2 to rotate. Once the frame 2 is rotated to a desired position, the movement of the connecting plate 61 stops, fixing the frame 2 in place.

Furthermore, there are no specific restrictions on the driver 63. For example, the driver 63 can be a pneumatic cylinder whose push rod is connected to the connecting plate 61 to drive its movement. Alternatively, the driver 63 can be a hydraulic cylinder, with its push rod connected to the connecting plate 61 to drive its movement. In this embodiment, the driver 63 is an electric cylinder, with its push rod connected to the connecting plate 61 to drive its movement.

Furthermore, please refer to FIG. 3 and FIG. 4, the mounting bracket 1 is provided with multiple guiding holes arranged in an array. The regulator 6 also comprises multiple guiding columns 62, which correspond one-to-one with the guiding holes. Each guiding column 62 is slidably mounted within a respective guiding hole along the vertical direction. The upper end of each guiding column 62 is connected to the connecting plate 61, so that the guiding columns 62 drive the movement of the connecting plate 61, thereby improving the movement accuracy of the connecting plate 61.

Figure 5:
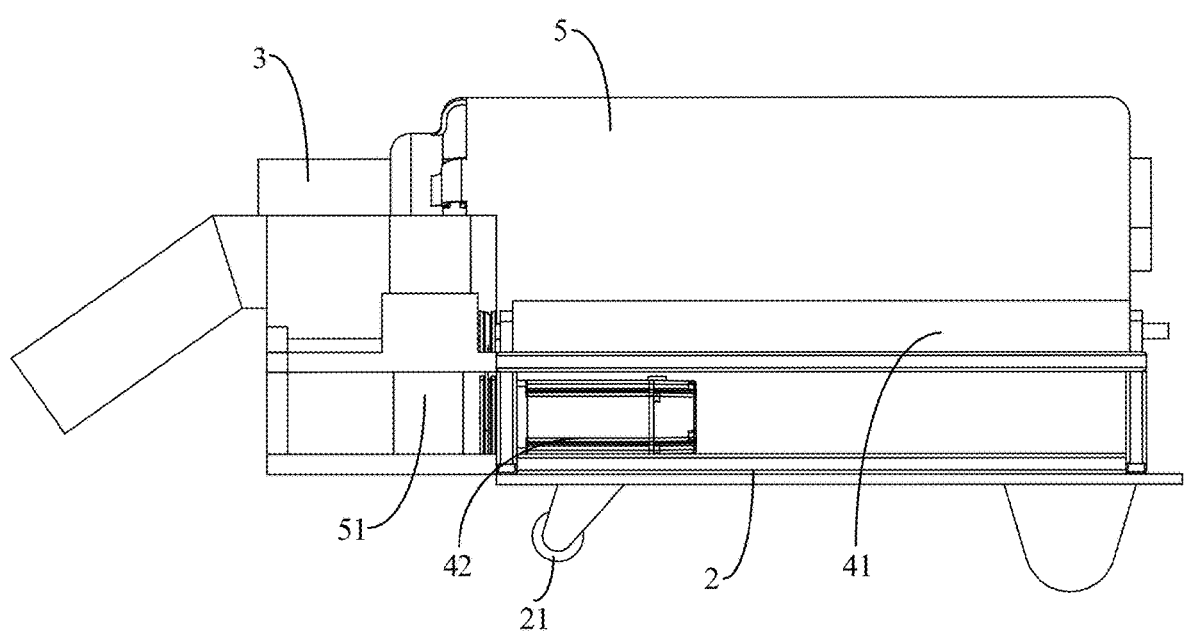
FIG. 5 is a front view of the frame and screening cylinder in FIG. 1.

Furthermore, please refer to FIG. 5, the bottom of the frame 2 is also provided with a rolling axis 21, which rotates along an axis in the second direction and is in contact with the upper side of the connecting plate 61. With this arrangement, the sliding friction between the frame 2 and the connecting plate 61 is converted into rolling friction, reducing the friction force and wear between them.

Furthermore, please refer to FIG. 3, the upper side of the connecting plate 61 is provided with a slide groove 611, which extends along the first direction. The rolling axis 21 is compatible with the slide groove 611 and is rotatably installed within it. The two opposite sidewalls of the slide groove 611 limit the movement of the rolling axis 21, preventing it from deviating from its intended path.

Furthermore, in this embodiment, the inner wall of the screening cylinder is equipped with multiple protrusions arranged in an array. By installing these protrusions, on the one hand, due to their obstruction, when the screening cylinder rotates, they can intercept and lift the ore. Subsequently, the ore falls under the force of gravity onto the protrusions below, causing adhered ore particles to separate and also exerting a crushing effect on the ore. On the other hand, the protrusions can also slow down the movement of the ore towards the discharge outlet, prolonging the residence time of the ore within the screening cylinder. This not only enhances the ore washing efficiency but also improves the cleaning effect while reducing water consumption. Additionally, the protrusions increase the surface area of the inner side of the screening cylinder, thereby enlarging the contact area with the ore. In this way, while ensuring sufficient contact area, compared to existing ore washing machines, it boasts the advantage of a smaller size, reducing the footprint of the equipment and improving the space utilization rate of the plant.

Furthermore, please refer to FIG. 8 to FIG. 9, the position of the protrusions 31 is not limited. To avoid interference with the screen holes 33, in this embodiment, the protrusions 31 are disposed on the side wall of the screening cylinder 3 between adjacent screen holes 33.

Furthermore, there are no specific restrictions on the form of the protrusions 31 attached to the screening cylinder 3. In this embodiment, the protrusions 31 are welded to the inner side wall of the screening cylinder 3.

Furthermore, there are various ways to arrange the multiple protrusions 31.

In one embodiment, the protrusions 31 extend in the radial direction of the screening cylinder 3. Multiple protrusions 31 are arranged at intervals along the circumferential direction of the screening cylinder 3, forming protrusion groups. There are multiple protrusion groups, and these protrusion groups are arranged at intervals along the radial direction of the screening cylinder 3. Such an arrangement allows the protrusions 31 to block and lift the ore as the screening cylinder 3 rotates. When the ore is lifted above the screening cylinder 3, it detaches from the protrusions 31 due to its own weight and falls onto the protrusions 31 below, causing adhering ore to separate. Additionally, the impact force can crush some of the ore, enhancing the ore washing efficiency.

In another embodiment, the protrusions 31 extend along the circumferential direction of the screening cylinder 3. Multiple protrusions 31 are arranged at intervals along the circumferential direction of the screening cylinder 3, forming protrusion groups. There are multiple protrusion groups, and these protrusion groups are arranged at intervals along the radial direction of the screening cylinder 3. Such an arrangement can slow down the movement of the ore towards the discharge outlet 35, prolonging the residence time of the ore within the screening cylinder 3 and improving the cleaning effect.

In another embodiment, the protrusions 31 are inclined relative to the radial direction of the screening cylinder 3 and are arcuately shaped. Multiple protrusions 31 are arranged at intervals along a spiral line, forming protrusion groups. There are multiple protrusion groups, and these protrusion groups are arranged at intervals along the circumferential direction of the screening cylinder 3. Such an arrangement not only slows down the movement of the ore but also lifts it to a higher position.

In this embodiment, please refer to FIG. 8 to FIG. 9, the multiple protrusions 31 comprise multiple first protrusions and multiple second protrusions. The first protrusions extend in the radial direction of the screening cylinder 3, and multiple first protrusions are arranged at intervals along the circumferential direction of the screening cylinder 3, forming first protrusion groups. There are multiple first protrusion groups, and these groups are arranged at intervals along the radial direction of the screening cylinder 3. The second protrusions extend along the circumferential direction of the screening cylinder 3, and multiple second protrusions are arranged at intervals along the circumferential direction, forming second protrusion groups. There are multiple second protrusion groups, and these groups are arranged at intervals along the radial direction of the screening cylinder 3. Among them, the multiple first protrusion groups and the multiple second protrusion groups are alternately arranged. Such an arrangement not only slows down the movement of the ore but also lifts it to a higher position, while ensuring the density of the screen holes 33 and avoiding interference with the screen holes 33.

Figure 6:
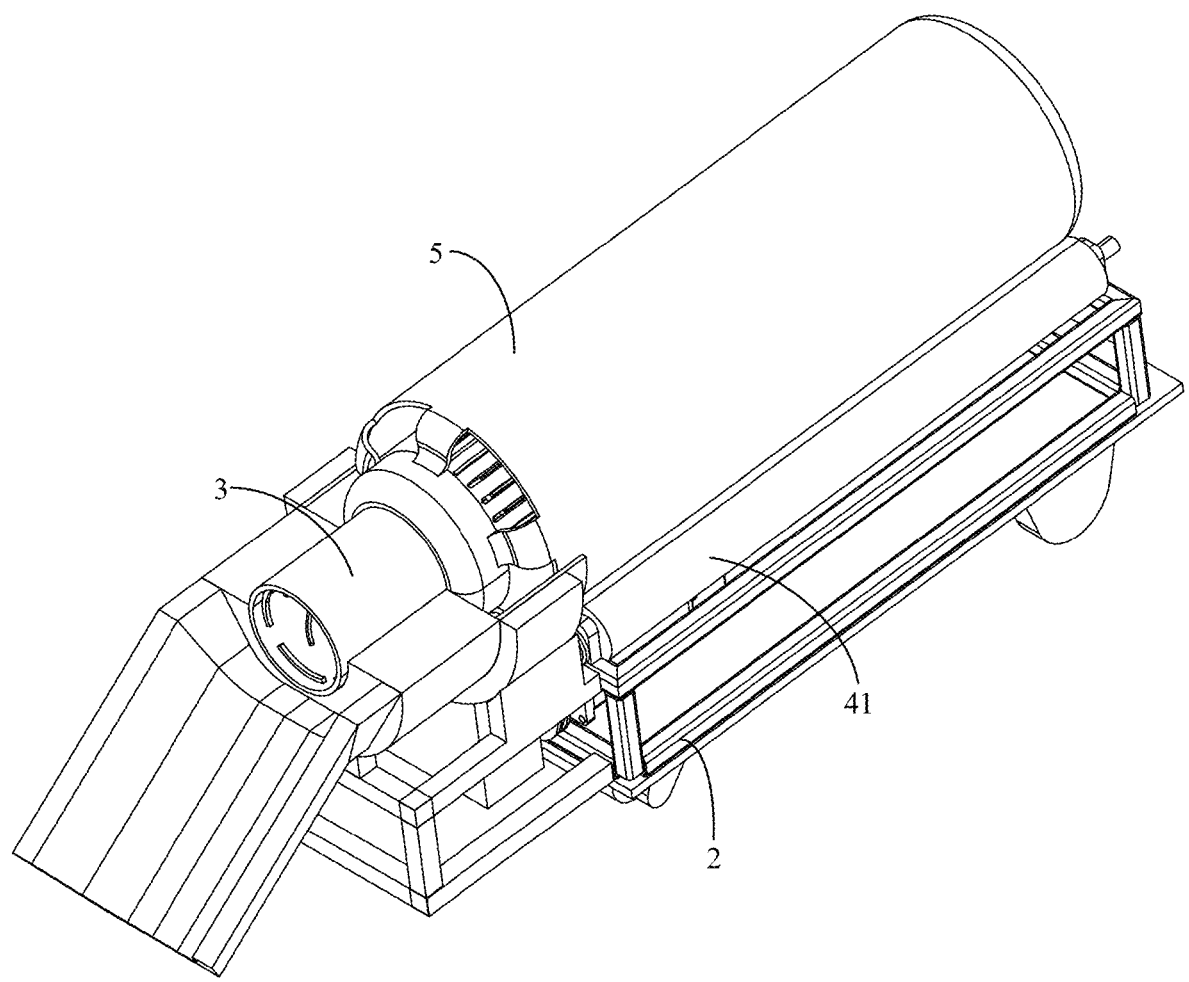
FIG. 6 is a three-dimensional schematic diagram of the frame and screening cylinder in FIG. 5.

Furthermore, the cylinder body 5 is fixedly connected to the screening cylinder 3, and the cylinder body 5 rotates along with the screening cylinder 3. Please refer to FIG. 5 to FIG. 6, the driving component 4 comprises two rotating shafts 41 and a driving motor 42. The two rotating shafts 41 are located on opposite sides of the cylinder body 5 along a second direction. Each rotating shaft 41 is rotatably installed on the frame 2 along the axis in a first direction, and each rotating shaft 41 abuts against the outer side surface of the cylinder body 5. The driving motor 42 is connected to one of the rotating shafts 41 to drive its rotation. Here, the first direction and the second direction are perpendicular to each other. Since the rotating shaft 41 abuts against the cylinder body 5, when the driving motor 42 rotates and drives one of the rotating shafts 41 to rotate, the friction between the rotating shaft 41 and the cylinder body 5 drives the cylinder body 5 to rotate, thereby driving the screening cylinder 3 to rotate. The other rotating shaft 41 serves as a support and assists in the rotation. The cylinder body 5 can be rotated by the two rotating shafts 41 and the driving motor 42. This structure is simple, low in cost, and convenient for assembly.

Furthermore, in this embodiment, the ore washing component comprises a water source device, a water pump, a water inlet pipe, and a control valve. One end of the water inlet pipe is connected to the water source device through the water pump, and the other end of the water inlet pipe extends into the screening cylinder 3 from the feed inlet 34. The control valve is installed on the water inlet pipe and is used to adjust the flow rate of the water inlet pipe.

Furthermore, in this embodiment, the cylindrical ore washing machine for hydrometallurgical processing of laterite nickel ore also comprises a conveying device. The conveying device is arranged corresponding to the feed inlet 34 and is used to convey ore into the screening cylinder 3.

Furthermore, in this embodiment, the control device is electrically connected to the driving motor 42 in the driving component 4, the concentration detection device, the control valve, the driver 63 in the regulator 6, and the conveying device. This allows the control device to control the operation of the driving motor 42 in the driving component 4, the concentration detection device, the control valve, the driver 63 in the regulator 6, and the conveying device.

The specific workflow is as follows: the control device obtains the concentration value detected by the concentration detection device and then compares it with a preset concentration value. Based on the comparison, the control device controls the operation of the control valve and the driver 63 in the regulator 6. Specifically, when the detected concentration value is greater than the preset concentration value, the control device adjusts the control valve to reduce the flow rate of water entering the screening cylinder 3 and controls the driver 63 in the regulator 6 to drive the connecting plate 61 to move vertically upwards, thereby decreasing the inclination angle of the screening cylinder 3. Conversely, when the detected concentration value is less than the preset concentration value, the control device adjusts the control valve to increase the flow rate of water entering the screening cylinder 3 and controls the driver 63 in the regulator 6 to drive the connecting plate 61 to move vertically downwards, thereby increasing the inclination angle of the screening cylinder 3. Additionally, the control device can also control the rotational speed of the cylinder body 5 by adjusting the driving motor 42 and control the amount of ore entering the screening cylinder 3 by adjusting the conveying device.

The above is only a preferred specific embodiment of this disclosure, but the scope of protection of this disclosure is not limited to this. Any changes or substitutions that can be easily conceived by those skilled in the art within the scope of the disclosed technology should be included in the scope of protection of this disclosure.

What is claimed is:

1. A cylindrical ore washer for hydrometallurgical smelting of laterite nickel ore, comprising:
    a mounting bracket;
    a screening component, wherein the screening component comprises a frame, a cylinder body, a screening cylinder, and a driving component; the cylinder body is rotatably installed on the frame along the axis in a first direction; the screening cylinder is fitted inside the cylinder body and is coaxially arranged with the cylinder body; the screening cylinder has a feed inlet and a discharge outlet at its opposite ends along the first direction, respectively; the screening cylinder is inclined downwards gradually from the feed inlet to the discharge outlet; a cylindrical wall of the screening cylinder is provided with multiple screen holes, the multiple screen holes connect the cylinder body and the screening cylinder; a baffle plate protrudes from an inner sidewall of the screening cylinder; the baffle plate is inclined relative to a radial direction of the screening cylinder, and is located at the discharge outlet; the cylinder body is also equipped with a liquid outlet, the liquid outlet is located at the end of the cylinder body near the discharge outlet; the driving component is installed on the frame and connected to the cylinder body to drive a rotation of the screening cylinder; wherein the frame is movably mounted on the mounting bracket, allowing an inclination angle of the screening cylinder to be adjustable;
    a regulator, wherein the regulator is installed on the mounting bracket and connected to the frame; when the frame is moved to a preset position, the regulator fixes the frame in place;
    a collection pool, wherein the collection pool is positioned corresponding to the liquid outlet and is used to collect mud and smaller diameter ores discharged from the liquid outlet;
    a concentration detection device, wherein the concentration detection device is installed within the collection pool and is used to detect a concentration of the material within the collection pool;
    an ore washing component, wherein the ore washing component is installed on the frame and is used to inject high-pressure water into the screening cylinder through the feed inlet to wash the ores; and,
    a control device, wherein the control device is electrically connected to the regulator, the ore washing component, and the concentration detection device, allowing the control device to control the operation of the regulator and the ore washing component based on the detected concentration;
    wherein the driving component comprises two rotating shafts and a driving motor; the two rotating shafts are located on opposite sides of the cylinder body along a second direction; each rotating shaft is rotatably installed on the frame along the axis in the first direction, and each rotating shaft abuts against an outer side surface of the cylinder body; the driving motor is connected to one of the rotating shafts to drive its rotation, the first direction and the second direction are perpendicular to each other.

2. The cylindrical ore washer for hydrometallurgical smelting of laterite nickel ore according to claim 1, wherein the baffle plate is set in an arcuate shape.

3. The cylindrical ore washer for hydrometallurgical smelting of laterite nickel ore according to claim 2, wherein there are multiple baffle plates, the multiple baffle plates are arranged in a spiral pattern along the radial direction of the screening cylinder at intervals.

4. The cylindrical ore washer for hydrometallurgical smelting of laterite nickel ore according to claim 1, wherein the frame has a first end and a second end opposite to each other along the first direction, the first end is rotatably mounted on the mounting bracket along an axis in the second direction, allowing the inclination angle of the frame to be adjustable; the feed inlet is located near the first end; the regulator is mounted on the mounting bracket and connected to the second end, when the frame is rotated to a preset angle, the regulator fixes the frame in place.

5. The cylindrical ore washer for hydrometallurgical smelting of laterite nickel ore according to claim 4, wherein the regulator comprises a connecting plate and a driver, the connecting plate is movably mounted on the mounting bracket along a vertical direction, with an upper side of the connecting plate in contact with the second end of the frame; the driver is mounted on the mounting bracket and connected to the connecting plate, driving a movement of the connecting plate.

6. The cylindrical ore washer for hydrometallurgical smelting of laterite nickel ore according to claim 1, wherein an inner wall of the screening cylinder is equipped with multiple protrusions arranged in an array.

7. The cylindrical ore washer for hydrometallurgical smelting of laterite nickel ore according to claim 6, wherein the protrusions extend in the radial direction of the screening cylinder; multiple protrusions are arranged at intervals along a circumferential direction of the screening cylinder, forming protrusion groups; there are multiple protrusion groups, and these protrusion groups are arranged at intervals along the radial direction of the screening cylinder.

8. The cylindrical ore washer for hydrometallurgical smelting of laterite nickel ore according to claim 6, wherein the protrusions extend along the circumferential direction of the screening cylinder; multiple protrusions are arranged at intervals along the circumferential direction of the screening cylinder, forming protrusion groups; there are multiple protrusion groups, and these protrusion groups are arranged at intervals along the radial direction of the screening cylinder.

9. The cylindrical ore washer for hydrometallurgical smelting of laterite nickel ore according to claim 1, wherein the ore washing component comprises a water source device, a water pump, a water inlet pipe, and a control valve; one end of the water inlet pipe is connected to the water source device through the water pump, and the other end of the water inlet pipe extends into the screening cylinder from the feed inlet; the control valve is installed on the water inlet pipe and is used to adjust a flow rate of the water inlet pipe.

* * * * *